United States Patent [19]

Psaar et al.

[11] 4,145,537
[45] Mar. 20, 1979

[54] CATIONIC DYESTUFFS

[75] Inventors: Hubertus Psaar; Roderich Raue, both of Leverkusen, Fed. Rep. of Germany

[73] Assignee: Bayer Aktiengesellschaft, Leverkusen, Fed. Rep. of Germany

[21] Appl. No.: 514,999

[22] Filed: Oct. 15, 1974

[30] Foreign Application Priority Data

Oct. 25, 1973 [DE] Fed. Rep. of Germany ....... 2353537

[51] Int. Cl.² .......................................... C07D 417/06
[52] U.S. Cl. ...................................... 542/465; 8/179; 8/177 R; 8/177 AB; 8/178 R; 542/466
[58] Field of Search ...................... 260/240 E, 240.8; 96/140; 542/465, 466

[56] References Cited

U.S. PATENT DOCUMENTS

| | | | |
|---|---|---|---|
| 2,289,303 | 7/1942 | Dieterle | 260/240.8 |
| 2,304,981 | 12/1942 | Wilmanns | 260/240.8 |
| 2,340,882 | 2/1944 | Kendall | 260/240.8 |
| 2,906,588 | 9/1959 | Brunkhorst et al. | 260/240 E |
| 3,314,796 | 4/1967 | Götze et al. | 260/240 E |
| 3,567,456 | 2/1971 | Riester et al. | 260/240 E |
| 3,850,913 | 11/1974 | Psaar | 260/240.8 |

Primary Examiner—Arthur P. Demers
Attorney, Agent, or Firm—Plumley and Tyner

[57] ABSTRACT

Dyestuffs of the formula

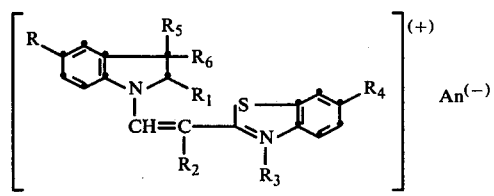

in which
R denotes hydrogen, alkyl, alkenyl, cycloalkyl, aralkyl, aryl, alkoxy, aralkoxy, aryloxy, alkylamino, aralkylamino, arylamino, acylamino, carboxylic acid ester, carbonamido, acyl, halogen or nitrile,
$R_1$ denotes hydrogen, alkyl or aralkyl,
$R_2$ denotes hydrogen, alkyl, alkenyl, carbonamide or nitrile,
$R_3$ denotes alkyl, alkenyl or aralkyl,
$R_4$ denotes hydrogen, alkyl, alkenyl, aralkyl, alkoxy or aralkoxy, alkylamino, aralkylamino, acylamino, carbonamido, nitrile, nitro or halogen,
$R_5$ and $R_6$ denote hydrogen, alkyl, aralkyl or a cycloaliphatic 5-membered or 6-membered ring, or $R_6$ together with $R_1$ forms a hydroaromatic 6-membered ring and
$An^{(-)}$ represents an anion, and processes for their preparation and their use for dyeing and printing natural and synthetic materials.

5 Claims, No Drawings

CATIONIC DYESTUFFS

The invention relates to dyestuffs of the general formula

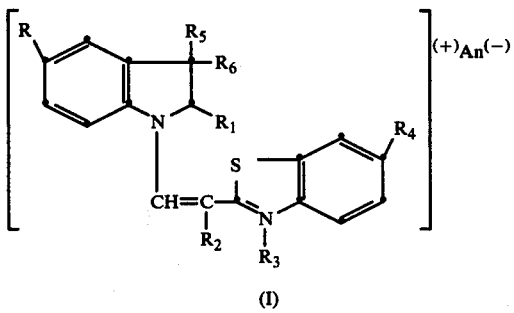

(I)

in which
R denotes hydrogen, an alkyl, alkenyl, cycloalkyl, aralkyl, aryl, alkoxy, aralkoxy or aryloxy radical, an alkylamino, aralkylamino, arylamino or acylamino radical, a carboxylic acid ester, carbonamido or acyl radical, halogen or nitrile,
$R_1$ denotes hydrogen or an alkyl or aralkyl radical,
$R_2$ denotes hydrogen, an alkyl, alkenyl or carbonamide group or nitrile,
$R_3$ denotes an alkyl, alkenyl or aralkyl radical,
$R_4$ denotes hydrogen, an alkyl, alkenyl, aralkyl, alkoxy or aralkoxy group, an alkylamino, aralkylamino or acylamino group, a carbonamido, nitrile or nitro group or halogen,
$R_5$ and $R_6$ independently of one another denote hydrogen or an alkyl or aralkyl radical or together form a cycloaliphatic 5-membered or 6-membered ring, or
$R_6$ together with $R_1$ forms a hydroaromatic 6-membered ring and
$An^{(-)}$ represents an anion
and also to processes for the preparation of these dyestuffs, and to their use for dyeing and printing natural and synthetic materials.

The following may be mentioned as examples of alkyl radicals R, $R_1$, $R_2$, $R_3$, $R_4$, $R_5$ and $R_6$: above all, $C_1$-$C_6$-alkyl radicals, such as the methyl, ethyl, n- and i-propyl, n-, sec.- and tert.-butyl radical and the n- and i-amyl radical and n-hexyl radical; in addition, $C_1$-$C_6$-alkyl radicals substituted by non-ionic substituents, for example halogen atoms, hydroxyl, $C_1$-$C_4$-alkoxy, nitrile, $C_1$-$C_4$-alkoxycarbonyl or carbonamide groups and/or carboxyl groups, such as the 2-chloroethyl, 2-hydroxyethyl, 2-cyanoethyl, 2-carbonamidoethyl, 2-methoxycarbonylethyl, 2-ethoxycarbonylethyl and 2-hydroxypropyl-(1) radical.

Possible alkenyl radicals R, $R_2$, $R_3$ and $R_4$ are above all $C_2$-$C_6$-alkenyl radicals, such as the vinyl, allyl, methallyl and 2-chloroallyl radical.

As cycloalkyl radicals R and $R_5 + R_6$ there should above all be mentioned the cyclopentyl and cyclohexyl radical and their derivatives substituted by non-ionic substituents, for example halogen atoms or $C_1$-$C_6$-alkyl groups and/or by carboxyl groups, such as the 4-chlorocyclohexyl radical and the dimethyl-cyclohexyl radical.

As aralkyl radicals, R, $R_1$, $R_3$, $R_4$, $R_5$ and $R_6$ there should above all be mentioned the benzyl, 2-phenylethyl, β-phenyl-β-hydroxyethyl and 2-phenyl-propyl-(2) radical and their derivatives substituted in the phenyl nucleus by non-ionic groups or atoms, for example halogen or $C_1$-$C_6$-alkyl groups, such as the 4-chlorobenzyl and 3-methylbenzyl radical.

Possible aryl radicals R are above all the phenyl and naphthyl radical and their derivatives substituted by non-ionic groups or atoms and/or by the carboxyl group, such as halogen, $C_1$-$C_6$-alkyl or $C_1$-$C_4$-alkoxy, e.g., the 4-methylphenyl, 3-chlorophenyl, 4-methoxyphenyl and 2-methyl-4-chlorophenyl radical.

The following may be mentioned as examples of R and $R_4$: as alkoxy groups, above all $C_1$-$C_4$-alkoxy groups, such as the methoxy, ethoxy, n-propoxy and n-, i-, sec.- and tert.-butoxy group; as an aralkoxy group, especially the benzyloxy group and its derivatives substituted in the phenyl nucleus by non-ionic substituents, such as the 4-chlorobenzyloxy and the 4-methyl-benzyloxy radical; as N-alkylamino radicals, above all $C_1$-$C_4$-alkylamino and di-($C_1$-$C_4$-alkylamino) radicals, such as the N-methylamino, N,N-diethylamino and N-butylamino radical and the N,N-di-n-propyl radical; as aralkylamino radicals, especially the benzylamino radical and the N-(ω-methyl-benzyl)-amino radical; as acylamino radicals, the formylamino radical and alkyl-carbonylamino radicals, especially $C_1$-$C_4$-alkylcarbonylamino radicals, such as the acetylamino, propionylamino and butyrylamino radical; benzenecarbonylamino radicals, such as the benzoylamino radical and its derivatives substituted in the phenyl nucleus by non-ionic substituents; $C_1$-$C_4$-alkylsulphonylamino groups, such as the methylsulphonylamino group; benzenesulphonylamino groups and their derivatives substituted in the phenyl nucleus by non-ionic substituents, for example the toluenesulphonylamino group; and the sulphonylamino group.

Further, the following may be mentioned for R: as aryloxy groups, above all the phenoxy group and its derivatives substituted in the phenyl ring by non-ionic substituents; as a carboxylic acid ester group, above all $C_1$-$C_4$-alkoxycarbonyl groups, such as the methoxycarbonyl, ethoxycarbonyl and butoxycarbonyl group; as acyl radicals, above all the radicals of $C_1$-$C_4$-alkyl-carboxylic acids, such as the formyl, acetyl, propionyl and butyryl radical; and also the radicals of $C_1$-$C_4$-alkyl-sulphonic acids, such as the methanesulphonyl and ethanesulphonyl radical.

Non-ionic substituents in the sense of the present invention are the non-dissociating substituents customary in dyestuff chemistry, such as halogen or alkyl, cycloalkyl, hydroxyl, alkoxy, aralkoxy, cycloalkoxy, aryloxy, acyloxy, acyl, alkoxycarbonyl, aminocarbonyl, nitrile, amino, alkylamino, dialkylamino, acylamino, alkylsulphonylamino, arylsulphonylamino, alkylsulphonyl, arylsulphonyl, aminosulphonyl, mercapto, alkylmercapto and arylmercapto groups.

In the before mentioned radicals preferably alkyl denotes $C_1$-$C_6$-alkyl, cycloalkyl denotes cyclopentyl or cyclohexyl, aryl denotes phenyl or naphthyl and acyl denotes $C_1$-$C_4$-alkylcarbonyl or -sulphonyl or phenylcarbonyl or -sulphonyl, and halogen denotes fluoro, chloro or bromo.

Preferred dyestuffs of the formula (I) are those which correspond to the formulae (II) and (III):

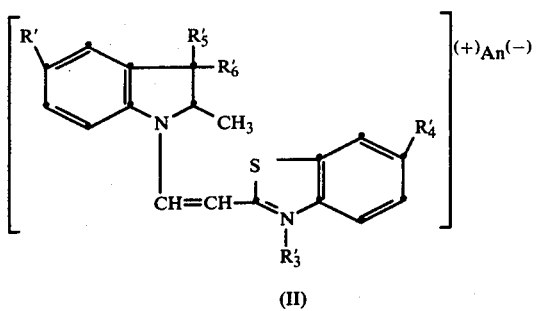

(II)

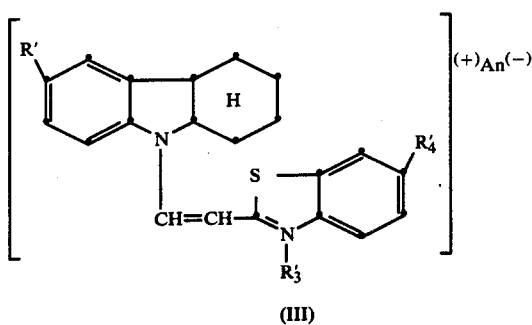

(III)

in which
R' denotes hydrogen, or a $C_1-C_4$-alkyl, $C_1-C_4$-alkoxy, benzyloxy, $C_1-C_4$-alkylamino, benzylamino or $C_1-C_4$-alkylcarbonylamino group,
$R'_3$ denotes a $C_1-C_4$-alkyl or benzyl radical,
$R'_5$ and $R'_6$ independently of one another denote hydrogen or a methyl group,
$R'_4$ denotes hydrogen, a $C_1-C_4$-alkyl, $C_1-C_4$-alkoxy, benzyloxy, $C_1-C_4$-alkylamino, benzylamino, $C_1-C_4$-alkylcarbonylamino, $C_1-C_6$-alkylsulphonylamino or nitro group or chlorine and
$An^{(-)}$ denotes an anion.

The dyestuffs of the formula (I) can be prepared according to various processes:
(A) by reaction of compounds of the formula

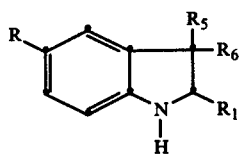

(IV)

either with benzthiazolium salts of the formula

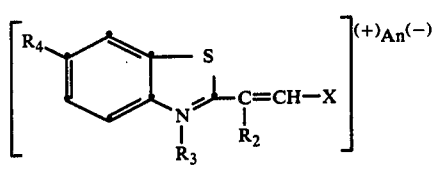

(V)

in which
X represents a hydroxyl group or a lower dialkylamino group
or with 2-methylenebenzthiazole-ω-aldehydes of the formula

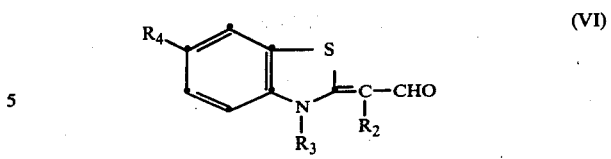

(VI)

in water and/or an organic solvent, in the presence of acids, at temperatures of 20° to 120° C., preferably 50° to 90° C.

Organic solvents which can be used are above all polar water-miscible organic solvents, such as alcohols, for example ethanol, acetonitrile, dimethylformamide, dimethylsulphoxide or acetic acid.

Suitable acids are both inorganic acids, such as hydrochloric acid, sulphuric acid and phosphoric acid, and organic acids, such as formic acid and acetic acid. The acids are employed in at least equimolar amounts relative to the compounds of the formula IV.

(B) By reaction of formamides of the formula

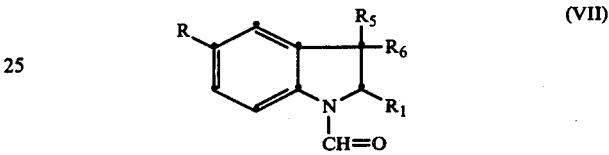

(VII)

with benzthiazolium compounds of the formula

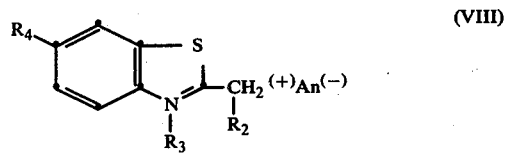

(VIII)

in acid condensation agents in the presence of an organic base, optionally in organic solvents which are inert under the reaction conditions, such as aromatic hydrocarbons, for example benzene, toluene or xylene, or chlorinated hydrocarbons, for example chloroform, carbon tetrachloride, chlorobenzene and dichlorobenzene. The acid condensation agents and the organic bases are employed in at least equimolar amounts relative to compounds of the formula (VII). The reaction is carried out at temperatures of 20° to 120° C., preferably 50° to 90° C.

The acid condensation agents used are the acid chlorides usually employed for the preparation of amidechlorides (see, for example, Angew. Chem. 72 (1960), page 836), for example phosgene, oxalyl chloride, phosphorus pentachloride and especially phosphorus oxychloride and thionyl chloride.

Organic bases which can be used are aliphatic, cycloaliphatic, araliphatic and heterocyclic amines, such as triethylamine, tri-n-propylamine, tri-i-propylamine, tributylamine, N-methylpiperidine, N-methylpyrrolidine and pyridine.

In the formulae IV, V, VI, VII and VIII, R, $R_1$, $R_2$, $R_3$, $R_4$, $R_5$, $R_6$ and $An^{(-)}$ have the meaning indicated under the formula I.

The following may be mentioned as examples of starting compounds for the processes of preparation A and B according to the invention:

For component IV, in particular 2,3,3-trimethylindoline, 5-methyl-2,3,3-trimethylindoline, 5-methoxy-2,3,3- trimethylindoline, 5-ethoxy-2,3,3-trimethylindoline, 5-propoxy-2,3,3-trimethylindoline, 5-butoxy-2,3,3-trimethylindoline, 5-benzyloxy-2,3,3-trimethylindoline, 5-benzylamino-2,3,3-trimethylindoline, 5-ethylamino-2,3,3-trimethylindoline, 5-isopropylamino-2,3,3-trimethylindoline, 5-acetylamino-2,3,3-trimethylindoline, 5-methylsulphonylamino-2,3,3-trimethylindoline, 5-methoxy-2-phenylethyl-3,3-dimethylindoline, 5-methoxy-2-(4-methyloxyphenylethyl)-3,3-dimethylindoline, 5-methoxy-2-(4-methylphenylpropyl)-3,3-dimethylindoline, 5-methoxy-2-phenylbutyl-3,3-dimethylindoline, 5-methoxy-2-acetyl-3,3-dimethylindoline, 5-methoxy-2-cyanomethyl-3,3-dimethylindoline, 5-methoxy-2-methylcarboxyethyl-3,3-dimethylindoline, 5-methoxy-2-methylcarbonylethylamido-3,3-dimethylindoline, 2-methylindoline, 5-methoxy-2-methylindoline, 1,2,3,4,10,11-hexahydrocarbazole, 1,2,3,4,10,11-hexahydro-11-methylcarbazole and indoline and 1,2,3,4,10-hexahydro-6-methoxycarbazole;

for component V, in particular 2-(2-dimethylaminovinyl)-3-methylbenzthiazolium chloride, 2-(2-dimethylamino-1-methylvinyl)-3-methylbenzthiazolium chloride, 2-(2-dimethylaminovinyl)-3-ethylbenzthiazolium trichlorozincate, 2-(2-dimethylaminovinyl)-3-butylbenzthiazolium chloride, 2-(2-dimethylaminovinyl)-3-allylbenzthiazolium chloride, 2-(2-dimethylaminovinyl)-3-benzylbenzthiazolium chloride, 2-(2-dimethylaminovinyl)-3,6-dimethylbenzthiazolium chloride, 2-(2-dimethylaminovinyl)-3-methyl-6-ethoxybenzthiazolium chloride, 2-(2-dimethylaminovinyl)-3-methyl-6-dimethylaminobenzthiazolium chloride, 2-(2-dimethylaminovinyl)-3-methyl-6-acetylaminobenzthiazolium chloride, 2-(2-dimethylaminovinyl)-3-methyl-6-methylsulphonamidobenzthiazolium chloride, 2-(2-dimethylaminovinyl)-3-methyl-6-nitrobenzthiazolium chloride, 2-(2-dimethylaminovinyl)-3-methyl-6-chlorobenzthiazolium chloride and 2-(2-dimethylamino-1-cyanovinyl)-3-methylbenzthiazolium chloride;

for component VI, in particular 3-methyl-2-methylenebenzthiazole-ω-aldehyde;

for component VII, in particular N-formyl-2,3,3-trimethylindoline, N-formyl-2,3,3,5-tetramethylindoline, N-formyl-5-methoxy-2,3,3-trimethylindoline, N-formyl-5-ethoxy-2,3,3-trimethylindoline, N-formyl-5-propoxy-2,3,3-trimethylindoline, N-formyl-5-butoxy-2,3,3-trimethylindoline, N-formyl-5-benzyloxy-2,3,3-trimethylindoline, N-formyl-5-benzylformylamino-2,3,3-trimethylindoline, N-formyl-5-acetylamino-2,3,3-trimethylindoline, N-formyl-5-methoxy-2-phenylethyl-3,3-dimethylindoline, N-formyl-5-methoxy-2-(4-methylphenylpropyl)-3,3-dimethylindoline, N-formyl-5-methoxy-2-(4-methoxyphenylethyl)-3,3-dimethylindoline, N-formyl-5-chloro-2,3,3-trimethylindoline, N-formyl-5-cyano-2,3,3-trimethylindoline, N-formyl-5-carbomethoxy-2,3,3-trimethylindoline, N-formylindoline, N-formyl-2-methylindoline, N-formyl-2-methyl-5-methoxyindoline, N-formyl-1,2,3,4,10,11-hexahydrocarbazole, N-formyl-1,2,3,4,10,11-hexahydro-11-methylcarbazole and N-formyl-1,2,3,4,10,11-hexahydro-6-methoxycarbazole;

for component VIII, in particular 2,3-dimethylbenzthiazolium methosulphate, 2-methyl-3-ethylbenzthiazolium methosulphate, 2-methyl-3-butylbenzthiazolium bromide, 2-methyl-3-allylbenzthiazolium bromide, 2-ethyl-3-methylbenzthiazolium ethosulphate, 2-cyanomethyl-3-methylbenzthiazolium methosulphate, 2-methyl-3-benzylbenzthiazolium bromide, 2,3,6-trimethylbenzthiazolium methosulphate, 2,3-dimethyl-6-ethoxybenzthiazolium methosulphate, 2,3-dimethyl-6-dimethylaminobenzthiazolium methosulphate, 2,3-dimethyl-6-acetylaminobenzthiazolium methosulphate, 2,3-dimethyl-6-methylsulphonamidobenzthiazolium methosulphate, 2,3-dimethyl-6-nitrobenzthiazolium methosulphate and 2,3-dimethyl-6-chlorobenzthiazolium methosulphate.

Possible anionic radicals An⁻ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methyl phosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethylbutyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycolether-propionic acid, the ether-propionic acid of the alcohol mixture with 6 to 10 carbon atoms, thioacetic acid, 6-benzoylamino-2-chlorocaproic acid, nonylphenol-tetraethylene glycolether-propionic acid, nonylphenoldiethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-α,α'-dicarboxylic acid, methylene-bis-thioglycollic acid, dimethyl sulphide-α,α-dicarboxylic acid, 2,2'-dithio-din-propionic acid, fumaric acid, maleic acid, itaconic acid, ethylene-bis-iminoacetic acid, nitrilotriacetic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{16}$ paraffinsulphonic acids, obtained by hydrolysis of the chlorosulphonation products of the corresponding n-paraffins.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalene- -sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions which do not excessively impair the solubility of the cationic compounds in water are preferred. The anion is in general decided by the process of preparation and by the purification of the cationic compounds which may be carried out. In general the cationic compounds are in the form of halides (especially chlorides or bromides) or methosulphates, ethosulphates, sulphates, benzenesulphonates or toluenesulphonates, or acetates. These anions can be replaced by other anions in a known manner.

The dyestuffs according to the invention are suitable for dyeing, printing and bulk dyeing of natural, semisynthetic and synthetic materials, above all materials of polyacrylonitrile or of copolymers of acrylonitrile with other vinyl compounds, such as vinyl chloride, vinylidene chloride, vinyl fluoride, vinyl acetate, vinyl alcohol, acrylic acid esters and amides and methacrylic acid esters and amides, and asymmetrical dicyanoethylene, or of acid-modified aromatic polyesters. Examples of acid-modified aromatic polyesters are polycondensation products of sulphoterephthalic acid and ethylene glycol, that is to say polyethylene glycol terephthalates containing sulphonic acid groups (type DACRON 64 of E. I. duPont de Nemours and Company), such as are described in Belgian patent specification No. 549,179 and U.S. Pat. No. 2,893,816. The dyestuffs are also suitable for dyeing acid-modified polyamide.

The dyeings and prints on these materials have excellent fastness properties, especially fastness to light. The dyestuffs are distinguished by exceptional tinctorial strength and exhibit a very good reserve action towards wool, cotton and polyester and polyamide which have not been acid-modified.

The parts mentioned in the examples are parts by weight.

EXAMPLE 1

13.3 parts of 2-methylindoline are stirred with 25.4 parts of 2-(2-dimethylaminovinyl)-3-methylbenzthiazolium chloride in 50 parts of 20% strength sulphuric acid and 30 parts of glacial acetic acid for 24 hours at 50° C. The reaction mixture is then poured into 500 parts of 10% strength sodium chloride solution. The dyestuff is filtered off, recrystallized from water and dried in vacuo at 70° C.

It has the formula

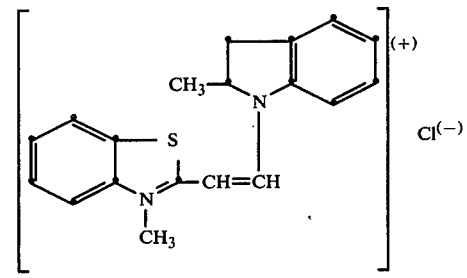

The dyestuff gives clear yellow dyeings, which are distinguished by very good fastness properties, on polyacrylonitrile and acid-modified polyester or polyamide fibres.

An equivalent yellow dyestuff was obtained when instead of 2-methylindoline the equivalent amount of 1,2,3,4,10,11-hexahydrocarbazole was employed; the dyestuff then has the formula

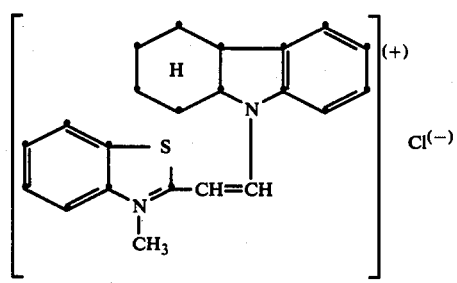

The 2-(2-dimethylaminovinyl)-3-methylbenzthiazolium chloride employed had been prepared as follows:

26 parts of 2,3-dimethylbenzthiazolium methosulphate were suspended in 30 parts of pyridine and a solution of 7.5 parts of dimethylformamide in 50 parts of phosphorus oxychloride was added; in the course thereof, the temperature rose to 90° C. After stirring for a further 30 minutes, the reaction mixture was introduced into 500 parts of 20% strength sodium chloride solution, whilst cooling with ice. The 2-(2-dimethylaminovinyl)-3-methylbenzthiazolium chloride which crystallized out was filtered off and dried in vacuo at 70° C.

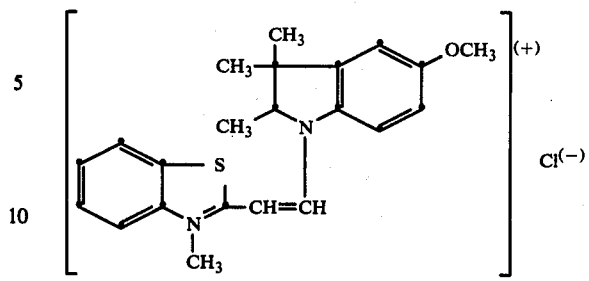

and is suitable for dyeing, printing and bulk dyeing of polyacrylonitrile, acid-modified polyesters or polyamides. It gives clear yellow dyeings or materials of yellow color, exhibiting excellent fastness properties.

If instead of N-formyl-5-methoxy-2,3,3-trimethylindoline the equivalent amount of N-formyl-1,2,3,4,10,11-hexahydrocarbazole was employed, the dyestuff described in Example 1, formula 2, was obtained.

If instead of 2,3-dimethylbenzthiazolium methosulphate and N-formyl-5-methoxy-2,3,3-trimethylindoline, equivalent amounts of the benzthiazolium compounds and N-formyl compounds indicated in the table which follows were employed, dyestuffs were obtained which give excellent fast dyeings, in the color shades also indicated in the table, on polyacrylonitrile fibre materials:

| Benzthiazolium salt | N-formyl compound | Colour shade |
|---|---|---|
| 2-Methyl-3-ethylbenzthiazolium ethosulphate | N-formyl-5-ethoxy-2,3,3-trimethylindoline | yellow |
| 2-Methyl-3-butylbenzthiazolium bromide | " | " |
| 2-Methyl-3-allylbenzthiazolium bromide | " | " |
| 2-Methyl-3-benzylbenzthiazolium bromide | " | " |
| 2,3-Dimethylbenzthiazolium methosulphate | N-formyl-5-chloro-2,3,3-trimethylindoline | yellow |
| 2-Ethyl-3-methylbenzthiazolium methosulphate | N-formylindoline | |
| 2-Cyanomethyl-3-methylbenzthiazolium methosulphate | " | " |
| 2,3,6-Trimethylbenzthiazolium methosulphate | N-formyl-2-methylindoline | " |
| 2,3-Dimethyl-6-ethoxybenzthiazolium methosulphate | " | " |
| 2,3-Dimethyl-6-acetylamino-benzthiazolium methosulphate | N-formyl-2,3,3-trimethylindoline | " |
| 2,3-Dimethyl-6-chlorobenzthiazolium methosulphate | " | " |
| 2,3-Dimethyl-6-nitrobenzthiazolium methosulphate | " | golden yellow |
| " | N-formyl-1,2,3,4,10,11-hexahydrocarbazole | " |
| 2,3-Dimethylbenzthiazolium methosulphate | N-formyl-1,2,3,4,10,11-hexahydro-6-methoxycarbazole | yellow |

EXAMPLE 2

26 parts of 2,3-dimethylbenzthiazolium methosulphate are suspended in 30 parts of pyridine and a cold solution of 22 parts of N-formyl-5-methoxy-2,3,3-trimethylindoline in 50 parts of phosphorus oxychloride is added whilst the suspension is at 60° to 70° C. After stirring for a further 30 minutes at 60° to 70° C., the reaction mixture is poured into 1,000 parts of 10% strength sodium chloride solution. The dyestuff is filtered off and dried in vacuo at 70° C. It has the formula

EXAMPLE 3

A solution of 19 parts of N-formyl-2,3,3-trimethylindoline in 50 parts of phosphorus oxychloride is added to a mixture of 27.5 parts of 3-ethyl-2-methylbenzthiazolium ethosulphate and 30 parts of tripropylamine. In the course thereof, the temperature rises to 90°–100° C. After stirring for a further 30 minutes, the reaction mixture is poured into 1,000 parts of ice-cold 10% strength sodium chloride solution. The dyestuff is filtered off and dried in vacuo at 70° C. It has the formula

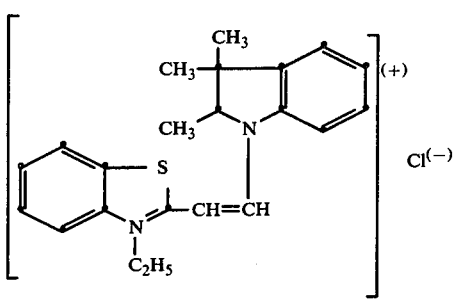

and gives clear yellow dyeings, having very good fastness, on polyacrylonitrile fibres and acid-modified polyester or polyamide fibres.

EXAMPLE 4

6.4 parts of 3-methyl-2-methylenebenzthiazolium-ω-aldehyde in 100 parts of 10% strength hydrochloric acid are stirred for 15 minutes. After addition of 4.5 parts of 2-methylindoline, the reaction mixture is stirred for 22 hours. The dyestuff is filtered off, washed with 100 parts of 20% strength sodium chloride solution and then dried in vacuo at 70° C. It has the structure indicated in Example 1, formula 1.

EXAMPLE 5

Using a liquor ratio of 1:40, polyacrylonitrile fibres are introduced into an aqueous bath at 40° C., which contains, per liter, 0.75 g of 30% strength acetic acid, 0.38 g of sodium acetate and 0.15 g of the dyestuff described in Example 2. The bath is heated to the boil over the course of 20 to 30 minutes and is kept at this temperature for 30 to 60 minutes. After rinsing and drying, a clear yellow dyeing is obtained, which is distinguished by very good fastness properties.

EXAMPLE 6

Using a liquor ratio of 1:40, acid-modified polyethylene glycol terephthalate fibres are introduced into an aqueous bath, at 20° C., which contains, per liter, 3 to 10 g of sodium sulphate, 0.1 to 1 g of oleyl polyglycol ether (50 mols of ethylene oxide per mol of oleyl alchol), 0 to 15 g of dimethylbenzyldodecylammonium chloride and 0.15 g of the dyestuff described in Example 1, and which has been adjusted to pH 4 to 5 with acetic acid. The bath is heated to 100° C. over the course of 30 minutes and is kept at this temperature for 60 minutes. The fibres are then rinsed and dried. A clear yellow dyeing having very good fastness properties is obtained.

EXAMPLE 7

0.055 g of the dyestuff described in Example 2 is worked into a paste with a 20-fold amount of hot water, with addition of a little acetic acid, in a 500 ml dyeing beaker which is in a heated water bath, and the paste is dissolved by means of hot water. 0.5 g of the reaction product of 50 mols of ethylene oxide with 1 mol of oleyl alcohol is further added to the dyeing liquor, which is made up to 500 ml with cold water. The pH value of the dyeing liquor is adjusted to 4.5-5 with acetic acid or sodium acetate.

10 g of piece goods of acid-modified polyamide are introduced at room temperature into the dyeing liquor which has thus been prepared. The dye bath is heated to 100° C. over the course of 15 minutes, with constant agitation of the goods being dyed. Dyeing is then carried out at the boil for 15 to 20 minutes. The piece goods are then rinsed with cold water and are finally dried. A very fast yellow dyeing is obtained.

EXAMPLE 8

A polyacrylonitrile woven fabric is printed with a printing paste which was prepared as follows: 330 parts of hot water are poured over 30 parts of the dyestuff described in Example 2, 50 parts of thiodiethylene glycol, 30 parts of cyclohexanol and 30 parts of 30% strength acetic acid and the resulting solution is added to 500 parts of crystal gum as the thickener. Finally, 30 parts of zinc nitrate solution are also added. The resulting print is dried, steamed for 30 minutes and then rinsed. A yellow print with very good fastness properties is obtained.

EXAMPLE 9

A stock solution is prepared from 15 parts of the dyestuff described in Example 2, 15 parts of polyacrylonitrile and 70 parts of dimethylformamide, and is added to a customary polyacrylonitrile spinning solution which is spun in a known manner. A yellow dyeing with very good fastness properties is obtained.

We claim:

1. Cationic dyestuffs, characterized in that they correspond to the formulae

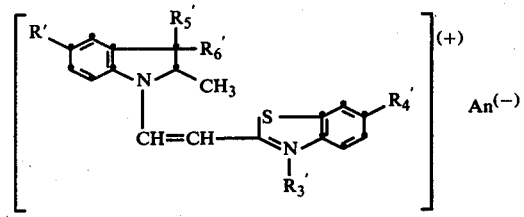

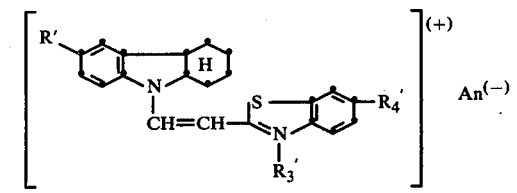

in which

R' denotes hydrogen, or a $C_1$–$C_4$-alkyl, $C_1$–$C_4$-alkoxy, benzyloxy, $C_1$–$C_4$-alkylamino, benzylamino or $C_1$–$C_4$-alkylcarbonylamino group, $R'_3$ denotes a $C_1$–$C_4$-alkyl or benzyl radical, $R'_5$ and $R'_6$ independently of one another denote hydrogen or a methyl group, $R'_4$ denotes hydrogen, a $C_1$–$C_4$-alkyl, $C_1$–$C_4$-alkoxy, benzyloxy, $C_1$–$C_4$-alkylamino, benzylamino, $C_1$–$C_4$-alkylcarbonylamino, $C_1$–$C_4$-alkylsulphonamido or nitro group or chlorine and $An^{(-)}$ denotes an anion.

2. Dyestuff according to claim 1 of the formula

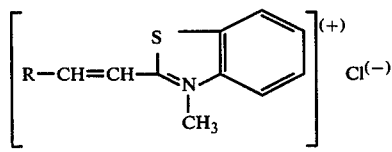
in which R is
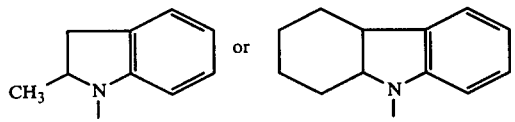
3. Dyestuff according to claim 1 of the formula
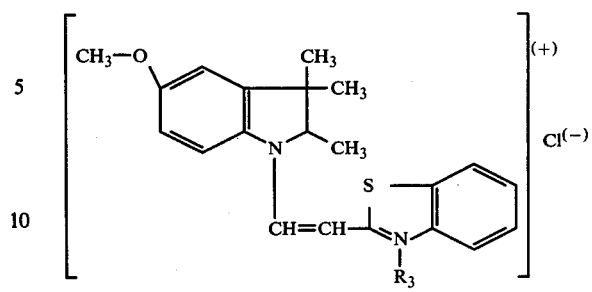
in which $R_3$ is methyl or butyl.
4. Dyestuff according to claim 1 of the formula
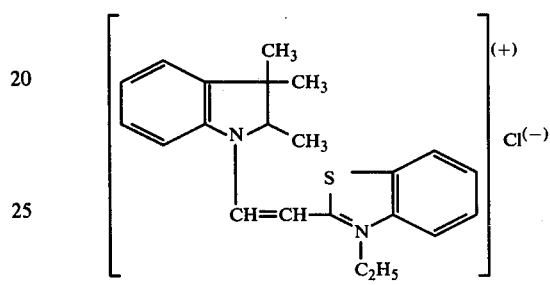
5. Dyestuff according to claim 1 wherein $R_4'$ is hydrogen.
* * * * *